Aug. 21, 1956  J. A. MILES  2,759,887
CATHODIC PROTECTION REGULATOR
Filed Jan. 24, 1951
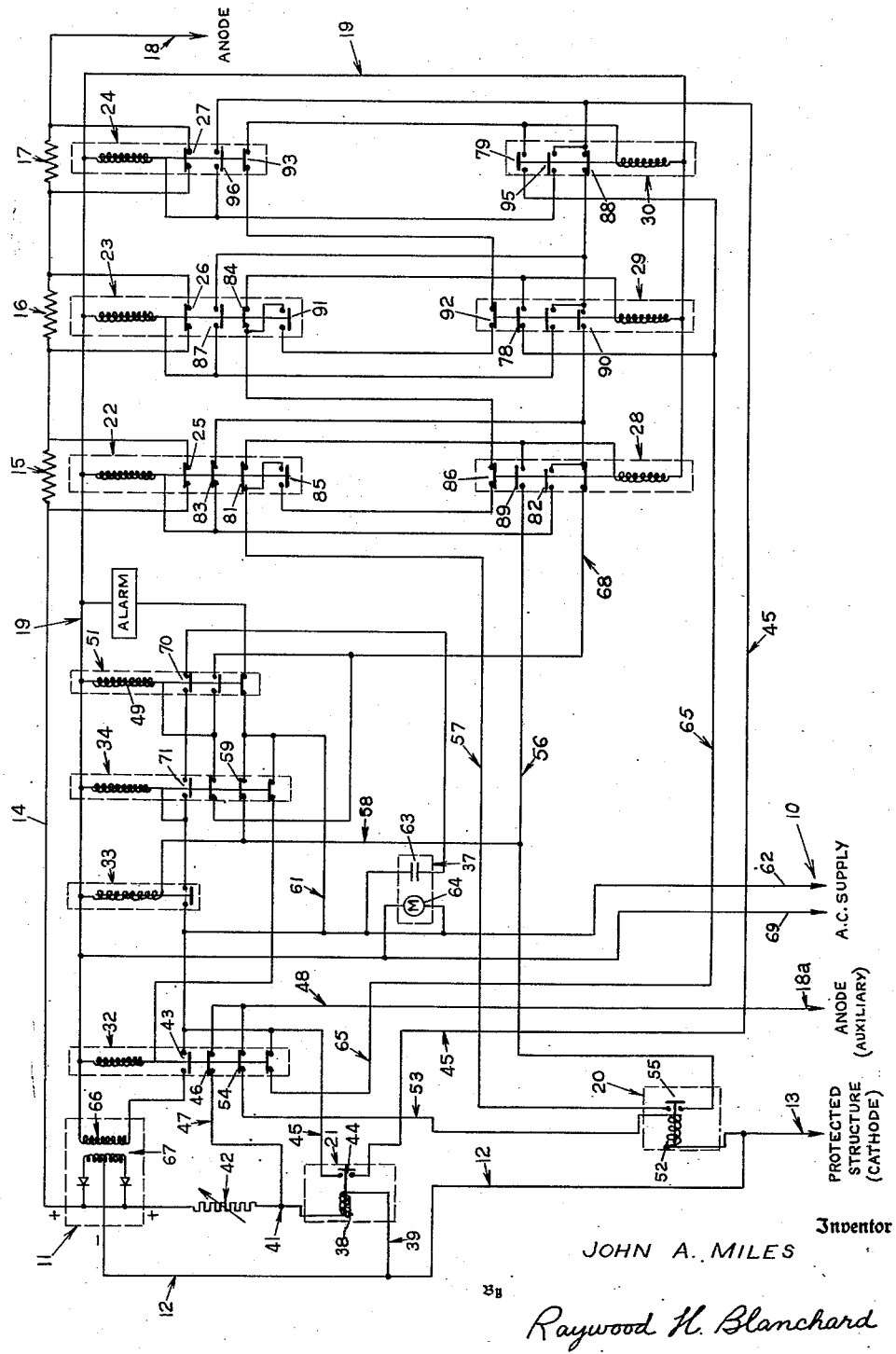
Inventor
JOHN A. MILES
By
Raywood H. Blanchard

United States Patent Office 2,759,887
Patented Aug. 21, 1956

2,759,887

CATHODIC PROTECTION REGULATOR

John A. Miles, Diablo Heights, Canal Zone

Application January 24, 1951, Serial No. 207,642

7 Claims. (Cl. 204—196)

(Granted under Title 35, U. S. Code (1952), sec. 266)

Be it known that the invention described in said following specification may be manufactured and used by or for the United States Government for governmental purposes without payment to me of any royalty thereon.

This invention relates to a method and device for regulating the current flow in a cathodic protection system, and particularly to such a device having means utilizing the back potential developed between the electrodes of the system, when the protective current is interrupted, for automatically controlling the said device.

While the general theory of cathodic protection of ferrous articles buried in the ground or immersed in water has long been known, the serious problem of accurately and automatically regulating the amount of current flowing between the electrodes in the protection system has, to my knowledge, remained unsolved.

Where this current flow is insufficient, the articles being protected (normally the cathode in a protective system), will become corroded; and, where the current is excessive, there is a waste of current and anode materials. Where painted surfaces are involved, excessive current will remove the paint and thereby increase the corrodible surface, hence the current demand. Since the range of desirable voltages is normally very narrow and since the protective voltage will periodically fluctuate out of this range under certain operating conditions, reasonably accurate control of the current flow is absolutely necessary for proper protection.

Where conditions are fairly stable, such as with an article buried in the ground, periodic manual checking and regulation of the protection system has been found reasonably satisfactory. However, where conditions are changing, such as with the article immersed in a liquid, the regulation problem can become so severe as to render manual control of the protection system extremely difficult at the very least.

One striking example of this problem has been found in effecting cathodic protection of the valves in the locks of the Panama Canal, wherein there are present several different factors all contributing to wide variations in the potential or current flow between the anode and cathode. These factors include: change in velocity and turbulence of the water during the normal operation of the locks, the position of the valve plates with respect to the water, the varying salinity of the water and the occasional chipping of paint from the plates by debris in the water. Under these conditions, the problem of accurately regulating the applied voltage manually is practically hopeless for the conditions are changing continuously in an unpredictable amount.

Further, manual control under such changing conditions is particularly complicated when the article being protected is inaccessible to visual inspection. Hence, failure of the protective system is not detected until the damage is well advanced and difficult to repair. This is particularly true in the underwater valves involved in hydro-electric operations, such as those associated with the Panama Canal locks.

Attempts have been made to provide automatic controls for regulating cathodic protection, but, insofar as I am aware, such attempts have not met with appreciable success. These attempts have usually stemmed from devices in which the regulation is based upon the conductivity of the electrolyte involved and have either completely ignored, or have been unable to take into account, either the resistance or the galvanic action involved between the surface of the material being protected, the paint covering the surface, and the electrolyte contacting same. Since these effects are of material magnitude, some system must be provided which will take them into account in order to meet satisfactorily the problem as above outlined.

In meeting the above problem, I have made use of the fact that when the protection potential is turned off, there exists between the article being protected (the cathode) and electrode cooperating therewith (the anode), a definite back potential, due to the galvanic action therebetween, which potential will be a precise function of the difference in electro-chemical activities of a protected cathode and a freely corroding anode. The back potential associated with a particular combination of anode and cathode at a given time is primarily determined by the degree of passivity of the cathode and is substantially independent of such variables as the conductivity of the electrolyte, and the resistance of the paint or other film existing on the surface of either the electrode or the article being protected. Thus, measurement of the back potential at a given time will present a value which is substantially a lineal function of the passivity of the cathode produced by the protective potential applied.

The said back potential, which is believed due to the chemical action of a film formed upon the article being protected (the cathode), is of such polarity as to tend to cause a current flow from the cathode to the anode through the electrolyte immediately following the interruption of the protective current flow between the anode and the cathode, and is substantially directly proportional to the effectiveness of the applied protective potential at the time of said interruption up to a point where energy is wasted in the decomposition of water and appreciable formation of gaseous hydrogen at the cathode surface.

The "protective" or "applied potential" will herein refer to the potential drop between the anode and cathode when the protective current is flowing, whereas the term "back potential" will refer to the potential difference existing between the cathode and anode when the protective current is interrupted. Specifically, as a result of extensive tests taken with painted ferrous articles in sea water, using ferrous anodes it has been found that where the back potential so measured is in excess of 0.4 volt the applied potential is too great, and where said back potential is less than 0.2 volt the applied potential is too little.

Accordingly, a principal object of this invention is to provide an automatic device for periodically measuring said back potential and utilizing the value thereof for controlling the value of the applied potential. A further object of the invention is to provide a method, and means for carrying out said method, for periodically and automatically adjusting the protective potential of a cathodic protection system to compensate for changing conditions under which said protection system is operating.

A further object of the invention is to provide a method, as aforesaid, which can be carried out by relatively simple and inexpensive equipment.

A further object of this invention is to provide apparatus for carrying out such a method.

A further object of the invention is to provide apparatus, as aforesaid, which will be both inexpensive to construct and simple and durable in operation.

A further object of the invention is to provide a method and apparatus therefor, of the nature aforesaid, which can be applied without material change under a wide variety of different conditions.

A further object of the invention is to provide apparatus, as aforesaid, which will be capable of operating over long periods of time without any supervision from an operator.

Further objects and purposes of this invention will be apparent to persons acquainted with the general problem upon reading the following specification and upon examination of the accompanying drawing.

In the drawing there is shown, diagrammatically, an electrical circuit illustrating apparatus by which the above objectives may be carried out.

GENERAL DESCRIPTION

The method herein provided utilizes (1) a periodic interruption of the protective potential, (2) the measuring of the amount of back potential existing between the article being protected and the anode, or the back potential existing between said article and an auxiliary electrode immersed in the same electrolyte, and (3) utilizing said measurement to control the magnitude of the protective potential.

In apparatus for carrying out this method, I have provided a time clock for periodically interrupting the protective potential which, at the same time, connects the article being protected and the anode to a circuit including a pair of measuring relays. One of said measuring relays operates if the back potential is above a predetermined, minimum value and both of said measuring relays operate if the potential is above a predetermined maximum value. The first of said measuring relays actuates other relays by which controllable resistances in the protective potential circuit are shunted out of said circuit, and the operation of both of said measuring relays actuates other relays by which said shunt circuits are opened and said resistances are introduced into the protective circuit. As a further refinement of this apparatus, it is also provided that said resistances are introduced into said protective circuit in small increments, and after each increase in resistance, said apparatus will again measure the back potential. If the value of said back potential, after this recheck, indicates that the protective potential is still larger than desired, the measuring relays will cause the introduction of additional resistance. In the particular embodiment of my invention here selected for illustrative purposes, this rechecking and further adjusting will continue to occur indefinitely until the protective potential is brought down to a value where the back potential falls within preselected limits.

Where the protective potential is too low, the measuring relays will, in this particular embodiment, operate first to remove all of the controllable resistances from the protective circuit and then proceed to add said resistances in increments as described above.

DETAILED DESCRIPTION

Inasmuch as the article being protected bears to the rest of the circuit a relation corresponding to that normally borne by a cathode in an electrolytic circuit, in the following description the article may be referred to as a "cathode" and it will be understood that such term will have reference to any article subjected to cathodic protection. The electrode used therewith may be termed as an "anode" and, where an auxiliary electrode is used for measuring the back potential, it may be referred to as an "auxiliary anode."

Referring now specifically to the drawing, a suitable source of power, such as standard 110 volt or 220 volt alternating current, is supplied through the terminals 10 to an alternating current rectifier 11 of a conventional type.

The negative terminal of the rectifier 11 is connected through the conductor 12 to the cathode 13, which, as stated, is the article to be protected and which is assumed to be immersed in an electrolyte, such as sea water. The positive terminal of the rectifier 11 is connected through the conductor 14 in series with a plurality of resistors, here the three resistors 15, 16 and 17, to the anode 18. These resistors 15, 16 and 17, may, by way of example, provide 1 unit, 2 units and 4 units of resistance, respectively, thereby providing through appropriate combination eight different values of resistance. It will be seen that this progression of resistance may be extended indefinitely so long as each additional resistor placed in series with said resistors 15, 16 and 17 has twice the resistance of the largest resistance in the series. When arranged in this fashion and controlled in the manner to be hereinafter described, the difference between each step and the succeeding one, when an increase in resistance becomes desirable, will be a change in circuit resistance equal to the value of the smallest resistor in the group.

The function of measuring the back potential between the cathode 13 and anode 18 is performed by the D. C., magnetic measuring relays 20 and 21, relay 20 sometimes being referred to as the "high-limit" relay, and relay 21 sometimes being referred to as the "low-limit" relay. Control of the protective potential, hence the current flow between anode and cathode, is provided by the A. C., shunt relays 22, 23 and 24, which are associated with the resistors 15, 16 and 17, respectively. Among other functions, said shunt relays, when operated, open contacts 25, 26 and 27, respectively, by which the current flowing through the conductor 14 would otherwise be permitted to by-pass the particular resistor of the particular shunt relay. The control of the shunt relays 22, 23 and 24 is provided primarily by A. C., initiating relays 28, 29 and 30, respectively, associated with said shunt relays. Other functions of sequence control, described in detail hereinafter, are provided by the A. C., magnetic relays 32, 33 and 34.

Control of the length of the time during which the protective current is interrupted for measurement of the back potential during each corrective step, and control of the length of the time between one adjustment of resistance and the recheck of the back potential to determine if such adjustment produced the desired results, are both provided by the time delay relay 33. Control of the time interval between check periods, wherein corrections are made, if necessary, is provided by the time switch 37, whose normally closed contacts 63 are opened for a few seconds at regular intervals, which intervals might range from 30 minutes to 24 hours, or more.

The expressions "normally open" or "normally closed," as applied to the relays and switches, or contacts thereof, herein, will have reference to their unenergized positions, as shown in the drawing.

The low voltage relay 21 has one terminal of its coil 38 connected through the conductor 39 and conductor 12 to the cathode 13, and the other terminal thereof connected through the conductor 41 and the variable resistor 42 to the positive terminal of the rectifier 11. When the contact 43 of the power relay 32 is closed, alternating current is permitted to flow from the A. C. source 10 to energize the rectifier 11 and the direct current thus produced by the rectifier 11 will flow through the variable resistor 42 and the coil 38 thereby closing contact 44 and energizing conductor 45 from the A. C. source 10. Conductor 45 will remain energized as long as contact 44 remains closed. However, when the coil of power relay 32 is de-energized, the contact 43 of the power relay 32 opens and contact 46 thereof is closed, thereby de-energizing the rectifier 11 and connecting the coil 38 of the relay 21 through the conductors 41, 47 and 48 to the auxiliary or measuring anode 18a. The potential difference existing between the cathode 13 and the auxiliary anode 18a with the rectifier 11 de-energized will thus be impressed across the coil 38. If this particular potential is less than the desired minimum, as 0.2 volt, the contact 44 of relay 21 will open. This de-energizes the conductor 45 thus providing the signal required to open any of the counting relays which may be closed, and to de-energize the coil 49 of the checking relay 51, thereby opening said checking relay 51, if it is closed. Use of the auxiliary anode 18a is not necessary to the satisfactory operation of the invention in its broadest aspects but is preferable under some circumstances.

The high limit relay 20 has one terminal of its coil 52 connected through the conductor 12 to the cathode 13, and the other terminal thereof connected through the conductor 53, the contacts 54 of the power relay 32, and the conductor 48 to the anode 18, only when the coil of power relay 32 is de-energized or, in other words, only when the rectifier 11 is de-energized. The relay 20 is designed to close its contacts 55 only if a back potential in excess of the desired maximum, say 0.4 volt, is impressed across its coil 52. When the contacts 55 of relay 20 are closed, current flows from the A. C. supply 10 through the conductors 62 and 61, the normally closed contacts 59 of time relay 34, conductors 58 and 56 to conductor 57. Accordingly, conductor 57 will be energized from the A. C. supply 10 only when the relays 34 and 32 are in their normally open positions, as illustrated, the rectifier 11 is de-energized and the back potential between the cathode 13 and anode 18 exceeds the desired maximum. The current passing through conductor 57 is transmitted to the winding of one of the initiating relays, such as 28, which must be operated to close its corresponding shunt relay 22 previously open, as shown in the drawing, and thereby acts to increase the resistance in the anode circuit by one, and only one, unit and, simultaneously, to de-energize the checking relay 51.

From the above, it will be seen that if relays 34 and 32 are both open and the rectifier 11 is de-energized while the back potential between the cathode and anode is within the desired limits, as between 0.2 to 0.4 volt, the conductor 45 will be energized and further will remain energized after relays 34 and 32 are reclosed. Likewise, it will be seen that under the above conditions conductor 57 will be de-energized and remain de-energized after relays 34 and 32 are closed.

Before describing the sequence of operation of relays 32, 33 and 34 and the switch 37, it is necessary to establish certain facts concerning the operation of checking relay 51, which facts will be clarified by an explanation of the operation of the shunt and initiating relays appearing hereinafter. For present purposes, therefore, it will be assumed that checking relay 51 will be open at the end of a period during which relays 34 and 32 were open, if at any time during that period there was a correction signal initiated by either high-limit relay 20 or low-limit relay 21. If no such signal was given, checking relay 51 will be found closed and remain closed after relays 34 and 32 have reclosed.

Assuming now that relays 32 and 34 are both open, that checking relay 51 is closed, and that the contacts 63 of switch 37 are closed, it will be found that rectifier 11 and the coils of 32 and 34 are de-energized, the coils 52 and 38 of relays 20 and 21, respectively, are connected between the anode 18a and the cathode 13, the motor 64 driving time switch 37 is energized as are also the conductors 56 and 65 leading to the initiating relays. If the back potential between anode 18a and cathode 13 is within the desired limits, conductor 45 leading to the pair of shunt and initiating relays associated with the highest resistance 17, will be energized while conductor 57 leading to the lowest shunt relays will be de-energized. The coil of time delay relay 33 will be energized from conductors 56 and 58. After the current has passed for a certain number of seconds through the relay 33, which may be a heating relay, its contacts will close, thereby energizing the coil of time relay 34 whereby its normally closed contacts will open and its normally open contacts will close.

As a result of this operation, conductor 56 is de-energized and the coil of power relay 32 is energized. Further, the coil of time relay 34 is connected through its own contacts 71 and a pair of closed, but normally open, contacts 70 on checking relay 51, which has been established as closed, and through the contacts 63 of the time switch 37 to the A. C. supply 10. This supplementary or sealing connection keeps time relay 34 energized after the contacts on relay 33, which was de-energized when conductor 56 was de-energized by time relay 34, have opened. The few seconds delay between deenergizing of relay 33 and the opening of its contacts have no significance at this point in the cycle except to insure positive and complete closure of the time relay 34. When time relay 34 is closed, it energizes the coil of power relay 32 which immediately closes.

It may now be seen by inspection that (1) power relay 32 will remain closed as long as time relay 34 is closed, and that the primary winding 66 of the transformer 67, which supplies the rectifier 11 with alternating current, is thereby energized so that the rectifier 11 can again send protective current through the electrolyte from anode 18 to cathode 13, (2) that conductor 65 has been de-energized, (3) that relay 20 has been disconnected from the anode 18 and (4) that the coil 38 of relay 21 is now connected so current flows from the positive terminal of the rectifier 11 through the variable resistor 42 through the coil of relay 21 back to the negative terminal of the rectifier 11. As has been explained, this current keeps the contacts of relay 21 closed and consequently conductor 45 remains energized. The conditions which have now been established will remain unchanged as long as the contacts 63 of time switch 37 remain closed and the protective system will be in operation with a fixed value of resistance included in the anode circuit.

It is next assumed that conditions in the protective circuit have been changed so that the protective potential is no longer correct. After the lapse of a predetermined period of time from the last corrective operation, the contacts 63 of time switch 37 will open for a few seconds during which time time relay 34 will be de-energized and will open. Although the contacts of time switch 37 reclose after a brief predeterminable time, no circuits will be re-established to the coil of time relay 34. With time relay 34 open, conductor 56 is energized and the coil of power relay 32 is de-energized thereby causing power relay 32 to open also. When power relay 32 opens, conductor 65 will be energized, the rectifier 11 will be de-energized thereby cutting off the protective current, and relays 20 and 21 will be connected between the anode 18a and the cathode 13. If the back potential between cathode and auxiliary anode is now assumed to be outside the desired limit, a signal will be transmitted to the shunt and initiating relays as follows:

If the back potential is too high, relay 20 will close its contacts thereby energizing conductor 57, or if the back potential is too low, relay 21 will open its contacts thereby de-energizing conductor 45. As will be explained hereinafter, the signal will initiate corrective action and will also de-energize the coil 44 of checking relay 51. After checking relay 51 opens, it will stay open until time relay 34 has been closed and then is reopened again, for reasons which will be given later. During the period in which conductor 56 is energized, the coil of time delay relay 33 will have been energized. After a delay sufficient to permit the proper corrective relays to operate, as detailed below, which delay is established by the characteristics of the relay 33, the contacts of relay 33 will close, energizing the coil of the time relay 34 with results as described in the immediately preceding paragraph, with the following exceptions.

First, the protective current will be different because different shunt relays will be closed, and second, because the checking relay 51 will now be open. With checking relay 51 open the coil of time relay 34 will only be energized as long as the contacts of relay 33 remain closed. The coil of relay 33 having been de-energized when time relay 34 closed, the contacts of relay 33 will open after a predeterminable delay, normally of a few seconds as established by the characteristics of this relay. Accordingly, time relay 34 will reopen after having been closed for a short time and when it opens the rectifier 11 will again be de-energized and other conditions as described hereinabove will be established. In addition, checking relay 51 will be energized by the flow of A. C. current through conductors 62, 45 and 68, the contacts of reopened time relay 34, and conductors 19 and 69, and will close again.

At this point a check is again made of the potential between anode and cathode. If this potential is still outside the desired limit, further correction will be made, as detailed below, and the checking relay 51 will open again followed by another brief period when protective current flows, followed by another back potential check and correction as may be required. Eventually, assuming of course that the number of steps available in the regulator and the range of resistance is suitably selected for the particular application, a back potential will eventually be reached which will be within the desired limit and which will reflect a desired protective potential while power relay 32 is open. At this point no corrective signal will be given, checking relay 51 will stay closed and, as described hereinabove, time relay 34 will seal itself and no further cycling will take place until the contacts 63 of the time switch 37 are again opened.

SHUNT AND INITIATING

Overvoltage signal

In partial review of the above paragraph, it has been established that conductor 45 is energized at all times except during a checking period (when power relay 32 is open) and then is de-energized only if during this time the potential between anode and cathode drops below the desired minimum value; conductor 57 is not energized except during a checking period and then, also, only if during this time the potential between anode and cathode is above the desired maximum value; conductor 56 is energized only during the checking period when time relay 34 is open; and conductor 65 is energized only during the checking period while power relay 32 is open.

Assuming now that all shunt and initiating relays are de-energized and open, and that a checking period has been initiated and, consequently, that conductors 45, 56 and 65 are energized, it may be seen that conductor 68 is also energized from conductor 45 through the normally closed contacts of each of the three initiating relays 28, 29 and 30. Assuming further that conductor 57 is energized as a result of the back potential being too high, the coil of the initiating relay 28 will be energized from conductor 57 through the normally closed contacts 81 on the shunt relay 22. Initiating relay 28 will accordingly close with the following results.

Conductor 68 leading to the checking relay 51 will be de-energized; the coil of shunt relay 22 will be energized from conductor 45 through the normally closed contacts on initiating relays 29 and 30 through the normally open, but now closed, contacts 82 of initiating relay 28; the coil of initiating relay 28 is connected to the previously energized conductor 56 preventing initiating relay 28 from subsequent reopening as long as conductor 56 remains energized. As the coil of the shunt relay 22 has now been energized, that relay will immediately close, whereupon the connection between conductor 57 and the coil of initiating relay 28 is opened; the coil of shunt relay 22 is now connected through its own normally open, but now closed, contacts 83 and through the normally closed contacts of initiating relays 29 and 30 to the energized conductor 45; and the normally closed contacts 25 of shunt relay 22, which when closed permit the shunting of resistance 15, are now open, thereby causing the protective current, after the rectifier 11 has been re-energized, to flow through the resistance 15, which is the smallest of the three resistances in this embodiment.

The first step of the required corrective action has now been taken with shunt relay 22 having been closed. However, initiating relay 28 is still closed and conductor 68 is still de-energized.

Assuming that the proper time delay has elapsed, the checking period will be terminated by energization of relays 34 and 32 and by the energization of the rectifier 11, in that order. Conductors 56 and 57 will be de-energized simultaneously which will, accordingly, de-energize initiating relay 28. Conductor 65 will be de-energized a fraction of a second later but, since neither initiating relay 29 nor initiating relay 30 is actuated during the above operation, no effect will be produced by such action. De-energization of initiating relay 28 will allow it to open and conductor 68 will again be energized from conductor 45 through the normally closed contacts of all stepping relays, but it is important to note that the sequence is such that it is impossible for conductor 68 to become energized until after time relay 34 has closed. The checking sequence now having been completed, shunt relay 22 is still closed and will remain closed as long as conductor 45 is energized and neither initiating relay 29 nor initiating relay 30 has been energized.

The rectifier 11 is now operating with the smallest resistance 15 in the anode circuit and the protective current will accordingly have been reduced slightly. Because a correction has been made, for reasons detailed later, the checking relay 51 will remain open even though conductor 68 is now energized and, for reasons previously explained, as soon as the contacts of relay 33 open, the protective current will again be interrupted and a new checking cycle be initiated. This time, however shunt relay 22 is closed when the checking cycle starts but, as before, initiating relays 28, 29 and 30 are open. The new checking cycle will, as before, energize conductors 56 and 65, and conductor 45 will, of course, remain energized.

Assuming that the potential between anode and cathode is still above the desired maximum, as measured by the back potential, a new signal will be produced by energizing conductor 57. This signal will pass through the normally open, but now closed, contacts 85 of shunt relay 22, through the normally closed contacts 86 of initiating relay 28 and through the normally closed contacts 84 of shunt relay 23, and will energize the coil of initiating relay 29. Initiating relay 29 will accordingly close with the result that shunt relay 22 and conductor 68 will be de-energized, the coil of initiating relay 29 will be connected through its own contacts 78 to conductor 65 and the coil of shunt relay 23 will be energized from conductor 45 through the normally closed contacts 88 of initiating relay 30 and through the now closed, but normally open, contacts 87 of shunt relay 23. Shunt relay 23 will, accordingly, close and thereby open the by-pass around its associated resistor 16.

The coil of shunt relay 23 will remain connected through its now closed, but normally open, contacts 87 to conductor 45 through the normally closed contacts of initiating relay 30. In the meantime shunt relay 22 will have opened thereby connecting conductor 57 to the coil of initiating relay 28 and causing that initiating relay also to operate. When relay 28 closes, its coil is connected to conductor 56 through its own normally open, but now closed, contact 89. However, unlike the action of the preceding sequence, shunt relay 22 will not be energized because initiating relay 29 is closed and its contacts 90 are open. At this point in the cycle initiating relays 28, 29 and 23 are closed and conductor 68 is de-energized.

Assuming that the proper time delay has elapsed, the checking period will be terminated by the energization of relays 34, 32 and the rectifier 11, in turn. Conductors 56 and 57 will be de-energized simultaneously, allowing initiating relay 28 to open and conductor 65 will be de-energized, thereby allowing initiating relay 29 to open. Shunt relay 23 will, however, remain closed, being energized by its own closed, but normally open, contacts and through the normally closed contacts of initiating relay 30 from conductor 45. At this point conductor 68 is again energized from the conductor 45 through the normally closed contacts of the stepping relays, but checking relay 51 will remain open. The rectifier 11 is again operating and the protective current is caused to flow through the resistor 16, but by-pass the resistors 15 and 17, whose associated shunt relays 22 and 24 are de-energized and hence now permit such by-passing. Since the resistor 16 is twice as large as the resistor 15, the protective current has been accordingly reduced proportionately as a result of the signal received during the last checking period.

After a short delay, another checking cycle will be initiated and, if the overvoltage signal is received again, relays 28 and 22 will again close precisely as during the first corrective action but shunt relay 23 will remain in its closed position as there will be no interruption of its sealing circuit through its own normally open, but now closed, contacts and the normally closed contacts of initiating relay 30 to conductor 45. When the cycle has been completed, shunt relays 22 and 23 will both be closed while all stepping relays will again be opened. Checking relay 51 will also be open. The protective current will now be flowing through resistors 15 and 16, these resistors being connected in series, while resistor 17 is by-passed by the normally closed contacts 27 of shunt relay 24, which relay is still open. The protective current has now been decreased from its initial value by insertion of resistance totaling three times the smallest resistance unit.

After a short delay, another checking cycle will be initiated resulting in the energization of conductors 56 and 65, conductor 45 remaining energized. If the potential between anode and cathode is still above the desired maximum, as indicated by the back potential, conductor 57 will again be energized and will be connected through the now closed, but normally open, contacts of shunt relay 22, thence through the normally closed contacts 86 of initiating relay 28, through the now closed, but normally open, contacts 91 of shunt relay 23, through the normally closed contacts 92 of initiating relay 29 and finally through the normally closed contacts 93 of shunt relay 24 to the coil of initiating relay 30, which will thus be energized. Closing initiating relay 30 results in connecting its own coil through contacts 79 to conductor 65, energizing the coil of shunt relay 24 by closing the contacts 95 and de-energizing the shunt relays 22 and 23 and the conductor 68 by opening the contacts 88. Shunt relay 24 will close and connect its coil to conductor 45 through contacts 96. The opening of shunt relays 22 and 23 will connect conductor 57 through the normally closed contacts of shunt relay 22 to the coil of initiating relay 28. When initiating relay 28 closes, it connects its coil to conductor 56 but has no effect upon shunt relay 22 because initiating relay 30 is still closed. Now we find relays 28, 30 and 24 closed with the remaining shunt and initiating relays still open and conductor 68 still de-energized. After the required time interval has elapsed, the checking period will be terminated by the energization of relays 34, 32 and the rectifier 11, in that order. Conductors 56 and 57 will be de-energized simultaneously thereby allowing initiating relay 28 to open. Next, conductor 65 will be de-energized, as described above, allowing initiating relay 30 to open and again energize conductor 68 from conductor 45 through the normally closed contacts of the initiating relays. Shunt relay 24 will remain energized through its own normally open, but now closed, contacts 96 from conductor 45. The protective current will now flow through the resistor 17 and will be by-passed around the resistors 15 and 16. As the resistor 17 has a value four times that of the resistor 16, in this particular embodiment, the current has again been reduced an additional unit.

It will now be apparent that further checking sequences produce signals by energizing the conductor 57, and an additional unit of resistance will be inserted in the anode circuit by each such sequence until shunt relays 22, 23 and 24 all remain closed simultaneously giving a total of seven times as much resistance as can be provided by the resistor 15 alone. It will also be apparent that the number of resistance steps available could readily be increased by adding more relays without affecting the principle of operation.

Assuming that the total resistance provided by the last corrective sequence described above reduced the protective potential between anode and cathode to within the desired limits, shunt relay 24 is now closed and all other shunt and initiating relays are de-energized. After a short delay, a checking sequence will be initiated, thereby energizing conductors 56 and 65. However, since the protective potential, as measured by the back potential, is between the desired limits, the conductor 57 is not now energized, but conductor 45 remains energized, as before. Accordingly, none of the initiating relays will be energized and shunt relay 24 will remain closed. Conductor 68 will be energized from conductor 45 through the normally closed contacts on the three initiating relays, and checking relay 51 will close and remain closed.

After a predetermined time interval has elapsed, the checking period is automatically terminated by the energization of relays 34, 32 and the rectifier 11, in that order. Checking relay 51 is now closed so no more checking cycles will be initiated until the time switch 37 again opens its contacts 63.

Although a great many separate relay operations were required to increase the resistance in the anode circuit, including conductor 14, from zero to that associated with the shunt relay 24, the actual time required need be no more than a minute or two depending primarily upon the characteristics of the time delay relay 33.

SHUNT AND INITIATING

Undervoltage signals

With the operating conditions established as described immediately above, namely, operating with four units of resistance in the anode circuit, it is now assumed that the area of surface requiring protection has been increased. For example, a protected plate immersed in sea water has had some paint chipped off. Under such conditions the energy stored in the protective film formed on the area previously protected, would be partially dissipated in attempting to fill the large protective current requirements demanded as a result of the area freshly exposed. The protective current supplied by the rectifier 11 tends to increase due to decreased resistance, but the increase would, by no means, be sufficient to maintain the protective potential within the desired limits.

In the present invention, no correction of this low potential will be made until the occurrence of the next regular checking period, as determined by the characteristics of the time switch 37. When the checking cycle is initiated, conductors 56 and 65 will be energized, as before, but since the potential between the anode 18 and cathode 13, as indicated by the back potential, is less than the desired minimum, an under voltage signal is transmitted by de-energizing conductor 45. Relays 24 and 51 are, accordingly, de-energized and will open as will all of the shunt and initiating relays. Assuming that the required time interval has elapsed, the checking period is terminated by energization of relays 34 and 32, and rectifier 11, in that order. After the closing of power relay 32, the relay 21 will reclose thereby energizing conductor 45 and conductor 68, but checking relay 51 will remain open.

The protective current is now supplied at its maximum value, the resistors 15, 16 and 17 being by-passed by the closing of the contacts 25, 26 and 27 in their corresponding shunt relays 22, 23 and 24, respectively. Checking relay 51, however, remains open and a new checking sequence is initiated after a brief time delay. This time, with all of the resistors 15, 16 and 17 out of the circuit, an over-voltage signal will be obtained. From this point on, successive checking cycles are repeated as described above for other over-voltage signals until sufficient units of resistance are reintroduced to cause the protective potential, as measured by the back potential, to come again within the desired limits.

As before, once the back potential lies within the proper limits, the checking relay 51 will remain closed and the next time relay 34 closes it will remain closed until another checking period is initiated by operating of the time switch 37.

*Checking relay*

If checking relay 51 is open, its coil can be energized only if relay 21 is closed, if the initiating relays 28, 29 and 30 are all open and if the time relay 34 is also open. Once checking relay 51 has been closed, it will remain closed irrespective of the position of the contacts of time relay 34, providing the conductor 68 is energized continuously. For that reason, when time relay 34 recloses after a checking sequence in which a correction has been made, checking relay 51 will be found to be open, either because one of the initiating relays is still closed, thereby de-energizing conductor 68, or because relay 21 is open due to under voltage, thereby de-energizing conductors 45 and 68. After time relay 34 closes, conductor 68 will again be energized but checking relay 51 will remain open. If during a checking sequence, time relay 34 being open, no corrective signal occurs, checking relay 51 will be energized from conductor 68 through the normally closed contacts of time relay 34 and, when closed, will seal itself in through its own normally open contacts.

To summarize, the protective potential between the anode 18 and cathode 13 is periodically checked automatically by measuring the back potential between the cathode 13 and the auxiliary anode 18a when the protective current flowing from anode to cathode is interrupted by switch 37. If the protective potential is either too large or too small, as indicated by measurement of said back potential, the device to which my invention relates, automatically changes the resistance in the anode circuit, thereby changing the protective potential between anode and cathode as required to maintain a back potential within certain preselected and predetermined limits. When the protective potential is too large, small units of resistance are added to the anode circuit, automatically and repeatedly, until the back potential has been appropriately reduced to within the prescribed limit. When the protective potential is below minimum, all of the resistance in the anode circuit is removed. The device being designed so that with no resistance in the anode circuit the protective potential will be substantially in excess of the normal requirements of a particular installation, this will produce an overvoltage condition. The system then operates in the same manner as for any over-voltage signal to introduce sufficient resistance back into the anode circuit to return the back potential to within the prescribed limits. The reintroduction of such resistance will be stepwise in sequence in the same manner as when the system indicates a need for additional resistance.

A particularly important feature of my device resides in the fact that even though sufficient resistance has been automatically placed in the anode circuit to produce the desired protective potential, the system rechecks itself before the checking period is completed. After the completion of the checking period, a protective current based on this checked resistance will continue to flow until the time switch 37 set according to a preselected schedule is reopened and the checking sequence is reinitiated.

Another important feature of my device is that it is peculiarly adapted for use in locations remote from expert supervision. Compensation will automatically be made for changes in line voltage, characteristics of the rectifier or modifications in size of the protected system. By conventional engineering methods, the device can readily be arranged to sound an alarm or give a remote signal if called upon to compensate beyond its control limits. When provided with pilot lights, an unskilled workman can determine by inspection that the protective system is operating and, more important still, that it is actually protecting. This is true because the measured quantity, back potential, does not exist in the absence of cathodic protection.

It will be recognized by persons skilled in this art that certain functions of my device may be accomplished by electronic or other means with comparable results. Therefore, although the above mentioned drawing and description apply to one particular, preferred method of effecting automatically controlled cathodic protection accurately within very small limits, and to a particular, preferred device for carrying out such method, it is not my intention, implied or otherwise, to eliminate other variations or modifications both in my method and device which do not depart from the scope of this invention unless specifically stated to the contrary in the hereinafter appended claims.

I claim:

1. In an apparatus for automatically regulating the value of the cathodic protection potential in a protective circuit having an anode, a cathode and a source of potential; the combination comprising: means periodically opening said cathodic protective circuit; a pair of control relays; conductors connecting said control relays in parallel with each other and between the cathode and the anode of said protective circuit one of said relays being such that it will close when the back potential between the cathode and the anode is above a predetermined minimum, and the other of said relays being such that it will close when said back potential exceeds a predetermined maximum; a plurality of resistances in series in said protective circuit, and independent means providing a shunt path around each of said resistances; a current adjusting switch in each of said shunt paths; means responsive to the opening of one of said control relays for closing said adjusting switches, and means responsive to the closing of the other of said control relays for opening a portion of said adjusting switches and means actuable after a selected time delay for again closing said cathodic protective circuit.

2. Apparatus as described in claim 1 including: means for again interrupting the cathodic protective current after a period of flow materially shorter than the interval between periodic interruptions; whereby the cycle will be repeated and further adjustment made to bring the protection potential toward a value within predetermined limits.

3. Apparatus for controlling the value of current passing through a cathodic protection circuit, said circuit including a power source, an anode and a cathode, comprising: means periodically interrupting the flow of said current; a pair of control relays connected in parallel with each other and between said anode and said cathode, the impedance of one of said relays being such that it will close when the back potential between the cathode and the anode is above a predetermined minimum, and impedance of the other of said relays being such that it will close when said back potential exceeds a predetermined maximum; a series of resistances in the cathodic protection circuit, and a circuit including a shunt switch shunting each of said resistances; circuitry independently opening each of said shunt switches; and means energized by said other relay energizing said circuitry for opening of said shunt switches, said means being so arranged that said switches open one at a time in cascade sequence upon each cycle of energization of said means.

4. In an apparatus for automatically regulating the value of the cathodic protection potential in a protective circuit having an anode, a cathode and a source of potential, the combination comprising, means periodically opening said cathodic protective circuit; first and second normally open control relays and means connecting same in circuit with said anode and said cathode upon termination of said protection potential, said first control relay operable only when a back potential exists between said cathode and said anode in excess of a first selected value and the second control relay operable only when a back potential exists between said cathode and said anode in excess of a second selected value, which second selected value is lower than said first selected value; conductors connecting said control relays in parallel with each other and between the cathode and the anode of said protective circuit; a plurality of resistances in series in said protective circuit, and independent means providing a shunt path around each of said resistances; a shunt switch in each of said shunt paths; means responsive to the opening of said first control relay for closing all of said shunt switches, and means responsive to the closing of said second control relay for sequentially opening said shunt switches until said back potential is in excess of said second selected value and means actuatable after a selected time interval for again closing said cathodic protector circuit and disconnecting said control relays.

5. In an apparatus for automatically regulating the value of the cathodic protection potential in a protective circuit having an anode, a cathode and a source of potential, the combination comprising: means periodically opening said cathodic protective circuit; first and second normally open control relays and means connecting same in circuit with said anode and said cathode upon termination of said protection potential, said first control relay operable only when a back potential exists between said cathode and said anode in excess of a first selected value and the second control relay operable only when a back potential exists between said cathode and said anode in excess of a second selected value, which second selected value is lower than said first selected value; conductors connecting said control relays in parallel with each other and between the cathode and the anode of said protective circuit; a plurality of resistances in series in said protective circuit, and independent means providing a shunt path around each of said resistances; a shunt switch in each of said shunt paths; means responsive to the opening of said first control relay for closing all of said shunt switches, and means responsive to the closing of said second control relay for opening one of said shunt switches and means actuatable after a selected time interval for again closing said cathodic protector circuit and disconnecting said control relays.

6. Apparatus as described in claim 5 including also means for again interrupting the cathodic protective current after period of flow materially shorter than the interval between said periodic interruptions; whereby the cycle will be repeated and said shunt switches will be caused to close sequentially for so long as said back potential is below said second selected value.

7. Apparatus for controlling the value of current passing through a cathodic protection circuit, said circuit including a power source, an anode and a cathode, comprising: means periodically interrupting the flow of said current; a pair of control relays connected in parallel with each other and between said anode and said cathode; means disconnecting said pair of control relays from said anode and said cathode when said protective current is applied to said anode and said cathode and said means connecting said pair of control relays to said anode and said cathode when the flow of said protective current is interrupted, the impedance of one of said relays being such that it will close when the back potential between the cathode and the anode is above a predetermined minimum, and impedance of the other of said relays being such that it will close when said back potential exceeds a predetermined maximum; a series of resistances in the cathodic protection circuit, and a circuit including a shunt switch shunting each of said resistances; circuitry opening each of said shunt switches when said one of said relays fails to close and circuitry opening one of said shunt switches when said other of said control relays closes; means holding said one of said shunt switches closed when said flow of protective current is again resumed.

References Cited in the file of this patent

UNITED STATES PATENTS

| | | |
|---|---|---|
| 1,142,858 | Tatum | June 15, 1915 |
| 1,438,946 | Conway | Dec. 19, 1922 |
| 2,021,519 | Polin | Nov. 19, 1935 |
| 2,176,514 | Thomson | Oct. 17, 1939 |
| 2,322,955 | Perkins | June 29, 1943 |
| 2,368,264 | Scott et al. | Jan. 30, 1945 |
| 2,584,816 | Sands | Feb. 5, 1952 |